United States Patent
Oh et al.

(10) Patent No.: US 7,810,952 B2
(45) Date of Patent: Oct. 12, 2010

(54) METHOD AND APPARATUS FOR MODULATING PARTICULAR LIGHT SOURCE USED FOR LASER DISPLAY

(75) Inventors: Su Hwan Oh, Daejeon (KR); Jong Moo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 363 days.

(21) Appl. No.: 11/930,727

(22) Filed: Oct. 31, 2007

(65) Prior Publication Data

US 2008/0117492 A1 May 22, 2008

(30) Foreign Application Priority Data

Nov. 7, 2006 (KR) .................. 10-2006-0109691

(51) Int. Cl.
  *G02B 26/08* (2006.01)
  *G02F 1/35* (2006.01)
  *H01S 3/10* (2006.01)
  *F21S 8/10* (2006.01)

(52) U.S. Cl. .................. 362/259; 362/317; 372/20; 372/21; 372/22; 372/23; 372/43.01; 359/326; 359/328

(58) Field of Classification Search .............. 372/20–23, 372/43; 385/14, 37, 129, 130, 88, 92–94; 362/259, 317; 359/303, 326, 328
See application file for complete search history.

(56) References Cited

U.S. PATENT DOCUMENTS 5,995,203 A    11/1999  Ueda
6,590,915 B1   7/2003   Kitaoka et al.
6,671,297 B2   12/2003  Takayama
2001/0005388 A1* 6/2001 Hirata et al. .................. 372/22
2003/0210716 A1 11/2003 Sakata et al.
2006/0017797 A1 1/2006  Morimoto et al.

FOREIGN PATENT DOCUMENTS

KR    1019970023620    5/1997
KR    1020060065865    6/2006

OTHER PUBLICATIONS

K. Mizuuchi, et al; "Harmonic blue light generation in X-cut MgO:LiNbO3 waveguide;" Electronics Letters, Apr. 24, 1997, vol. 33, No. 9, pp. 806-807.
Yasuo Kitaoka, et al; "Miniaturized Blue Laser using Second Harmonic Generation;" Jpn. J Apply Phys. vol. 38, (2000) pp. 3416-3418, Part 1, No. 6A, Jun. 2000.
Masami Hatori, et al; "Development of Blue Waveguide SHG (Second Harmonic Generation) Laser;" FujiFilm Res. & Dev. vol. 49, pp. 26-31 (2004).
Korean Notice of Patent Grant dated Feb. 26, 2008 for the corresponding application KR 10-2006-0109691.
European Search Report; dated Oct. 22, 2008; Application No./ Patent No. 07120146.1-2202 / 1921868.

* cited by examiner

*Primary Examiner* — Evelyn A. Lester
(74) *Attorney, Agent, or Firm* — Ladas & Parry LLP

(57) ABSTRACT

A method and apparatus for modulating a particular light source used for laser display are provided. The apparatus includes a digital modulator digitally modulating light output from a semiconductor laser to a frequency higher than a repetition frequency required for laser image display; and a pixel brightness adjustor inserting at least one high-speed pulse into a period of the modulated output light, which is required for a single pixel, and adjusting a brightness of the pixel by adjusting the number of the inserted high-speed pulses.

6 Claims, 3 Drawing Sheets

METHOD AND APPARATUS FOR MODULATING PARTICULAR LIGHT SOURCE USED FOR LASER DISPLAY

CROSS-REFERENCE TO RELATED PATENT APPLICATIONS

This application claims the benefit of Korean Patent Application No. 10-2006-0109691, filed on Nov. 7, 2006, in the Korean Intellectual Property Office, the disclosure of which is incorporated herein in its entirety by reference.

BACKGROUND OF THE INVENTION

1. Field of the Invention

The present invention relates to a method and apparatus for modulating a particular light source used for laser display, and more particularly, to an apparatus and method for converting tunable laser light into a green light source using quasi-phase-matching second-harmonic generation (QPM-SHG) and modulating the laser light into a stable laser display light source using digital modulation.

This work was supported by the IT R&D program of MIC/IITA [2005-S-051, Photonic device integrated module for optical access network]

2. Description of the Related Art

Laser display is expressed by using a method of modulating the outputs of a blue laser, a green laser, and a red laser according to the scan period of a scan mirror. Recently, microminiature and low-power laser displays, which can be easily carried, have become popular. In order to implement these laser displays, tri-color light sources, which are modulated to a level of 20 MHz when video graphics array (VGA) images are displayed, are required. Conventionally, semiconductor lasers have implemented modulation light sources for blue and red. However, it is difficult to directly realize green color using a semiconductor laser.

Processing light output from a wavelength-adjustable semiconductor laser, i.e., a Distributed Bragg Reflector Laser Diode (DBR LD) by using a Quasi-Phase-Matching Second-Harmonic Generation (QPM-SHG) device has been considered in order to implement green color. However, color conversion using the QPM-SHG device is so sensitive to wavelength change that when an output of the DBR-LD is modulated to about 20 MHz, it is difficult to exactly maintain the wavelength of the output. Moreover, it is difficult to adjust green light output to a desired brightness on a screen in analog mode.

SUMMARY OF THE INVENTION

The present invention provides a method and apparatus for providing digital on/off modulation, by which output light of a semiconductor laser is modulated to a frequency that is much higher than an actually required repetition frequency of 20 MHz and a high-speed pulse is inserted into the modulated output light.

According to an aspect of the present invention, there is provided an apparatus for modulating a particular light source for laser display. The apparatus includes a digital modulator digitally modulating light output from a semiconductor laser to a frequency higher than a repetition frequency required for laser image display, and a pixel brightness adjustor inserting at least one high-speed pulse into a period of the modulated output light, which is required for a single pixel, and adjusting a brightness of the pixel by adjusting the number of the inserted high-speed pulses.

According to another aspect of the present invention, there is provided a method of modulating a particular light source for laser display. The method includes digitally modulating light output from a semiconductor laser to a frequency higher than a repetition frequency required for laser image display, and inserting at least one high-speed pulse into a period of the modulated output light, which is required for a single pixel, and adjusting brightness of the pixel by adjusting the number of the inserted high-speed pulses.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
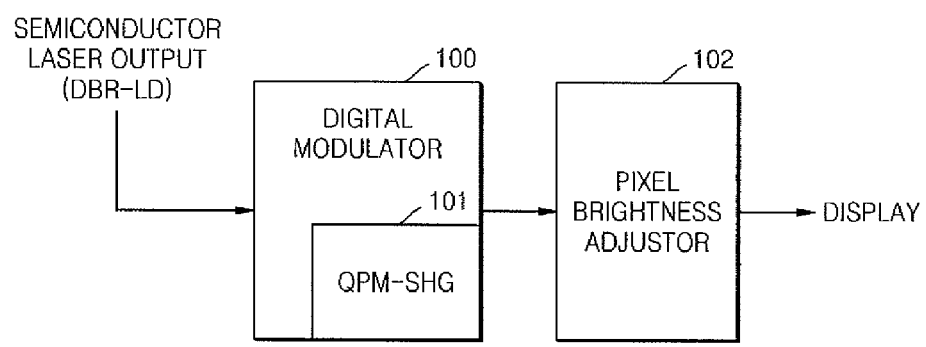
FIG. 1 illustrates an apparatus for modulating a particular light source used for laser display according to an embodiment of the present invention.

Hereinafter, preferred embodiments of the present invention will be described in detail with reference to the attached drawings. In the drawings, like reference numerals refer to the like elements.

FIG. 1 illustrates an apparatus for modulating a particular light source used for laser display according to an embodiment of the present invention. A digital modulator 100 included in the apparatus digitally modulates light output from a semiconductor laser, e.g., a Distributed Bragg Reflector Laser Diode (DBR-LD), to a frequency higher than a repetition frequency that is normally requested to realize laser image display.

When a light source having a frequency of 20 MHz is required, the same effect can be achieved by modulating the DBR-LD to a frequency, e.g., 1 GHz, which is much higher than 20 MHz, and inserting 50 pulses having a cycle of 1 ns into a period of 50 ns of the frequency of 20 MHz. In other words, the light output from the DBR-LD can be provided at the same brightness as other analog light sources by setting the number of high-speed pulses to a natural number obtained by dividing the frequency of the modulated output light by the repetition frequency of an analog light source used to realize laser image display.

In particular, when tunable light is converted into green light using a Quasi-Phase-Matching Second-Harmonic Generation (QPM-SHG) device 101 and then processed by digital on/off modulation, a green light source for laser display can be obtained.

A pixel brightness adjustor 102 inserts at least one high-speed pulse into a period required for the realization of a single pixel in the modulated light output from the digital modulator 100, thereby generating a light source which can be used as a display light source together with other analogously modulated light sources having a low frequency, according to the number of inserted high-speed pulses. At this time, the number of high-speed pulses inserted into the period of the modulated output light corresponds closely to the brightness of the pixel. For example, when 50 high-speed pulses are inserted into a single period, brightness realized on a screen is adjusted by the number of on/off pulses among the 50 pulses. People perceive a brightness difference on the screen between when one of the 50 pulses is turned on and when all 50 pulses are turned on, at a ratio of 1:50.

The above-described method is possible due to the following reasons. Unlike analog modulation in which it is difficult to maintain the wavelength of the DBR-LD, the wavelength of the DBR-LD can be easily maintained during 1 GHz high-speed digital modulation. In addition, precise output adjustment is not needed as much in digital modulation as it is in analog modulation.

Figure 2:
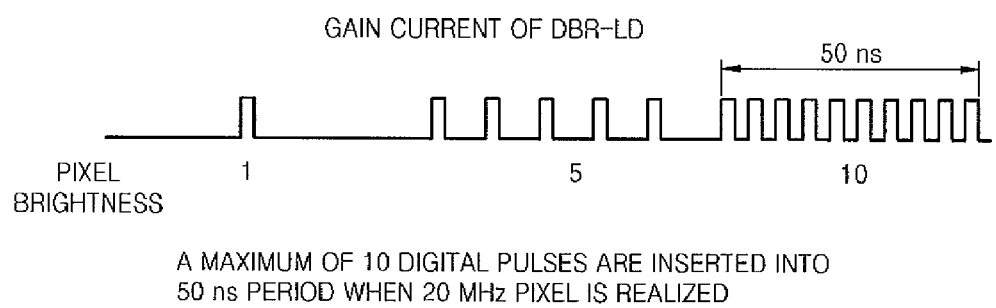
FIG. 2 illustrates high-speed pulses inserted to a period of modulated laser light according to an embodiment of the present invention.

FIG. 2 illustrates high-speed pulses inserted to a period of modulated laser light according to an embodiment of the present invention. In detail, FIG. 2 illustrates digital modulation signals including one, five, and ten pulses, respectively in a period of 50 ns in order to realize a 20 MHz pixel frequency. In other words, digital configurations, in which one, five, and ten pulses are respectively turned on, are shown. When the current of the DBR-LD is modulated in this manner, human eyes perceive the brightness at a ratio of 1:5:10. Accordingly, the same effect as the output of the DBR-LD being analogously modulated at a ratio of 1:5:10 can be obtained.

Figure 3:
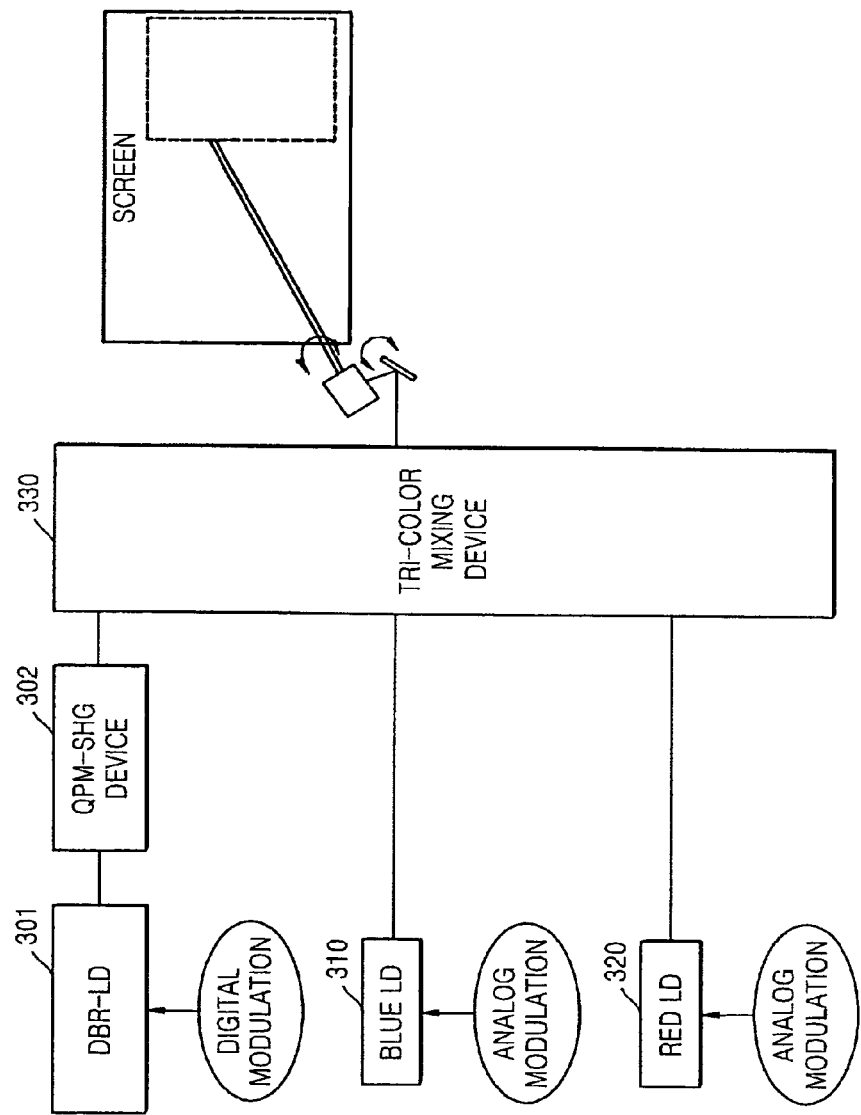
FIG. 3 illustrates laser projection display according to an embodiment of the present invention.

FIG. 3 illustrates laser projection display according to an embodiment of the present invention. Referring to FIG. 3, a blue LD 310 and a red LD 320 can directly adjust their outputs to 20 MHz so as to be suitable for pixel brightness using analog modulation without any problem. For green color, which is difficult to realize with the analog modulation, high-speed digital modulation controlling the number of pulses is used to adjust an output of a DBR-LD 301. In other words, the output light of the tunable DBR-LD 301 for green light generation is converted and digitally modulated to green light using a quasi-phase-matching second-harmonic generation (QPM-SHG) device 302. Green, blue, and red light sources are processed by a tri-color mixing device 330 and projected to a screen, whereby an image is displayed.

Figure 4:
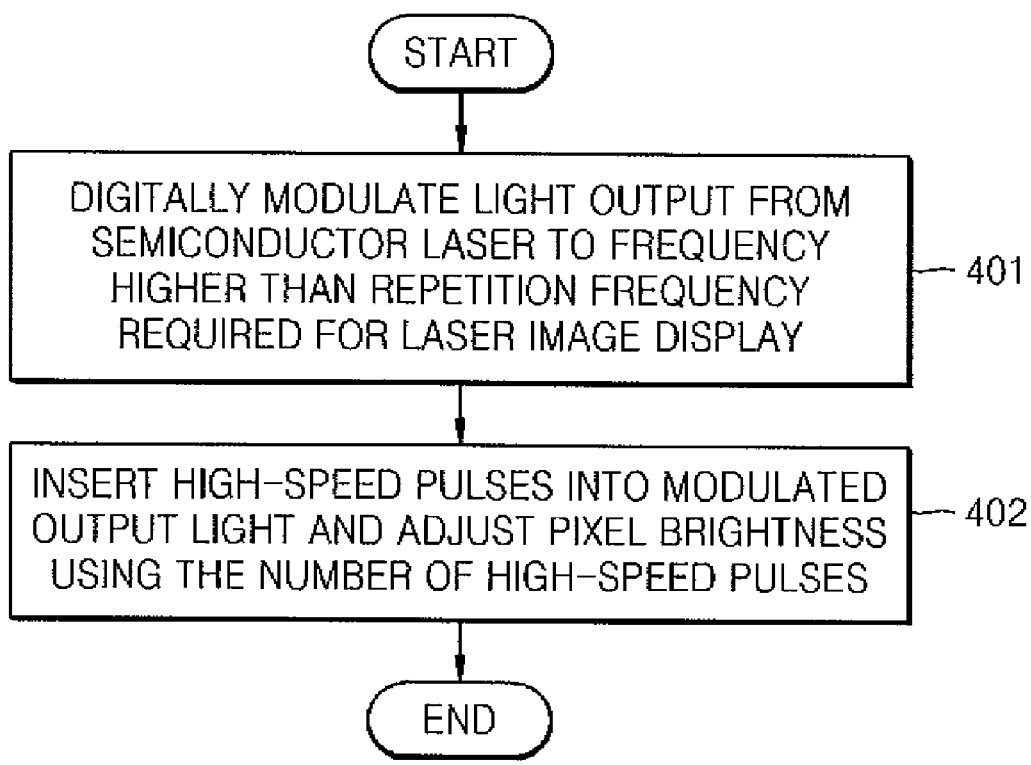
FIG. 4 is a flowchart of a method of modulating a particular light source used for laser display according to an embodiment of the present invention.

FIG. 4 is a flowchart of a method of modulating a particular light source used for laser display according to an embodiment of the present invention. In operation 401, light output from a semiconductor laser is digitally modulated to a frequency higher than a repetition frequency required to perform laser image display. In operation 402, at least one high-speed pulse is inserted into a period of the modulated output light and the number of the inserted high-speed pulses is adjusted so as to control the brightness of a pixel.

According to the present invention, a green light source, which is difficult to obtain using analog modulation, can be easily obtained from light output from a green semiconductor laser using digital modulation that is not sensitive to a change in wavelength. In addition, the brightness of a pixel can be distinctively realized using digital on/off modulation. As a result, improved laser display can be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for modulating a particular light source for laser display, the apparatus comprising:
    a digital modulator digitally modulating light output from a semiconductor laser to a frequency higher than a repetition frequency required for laser image display; and
    a pixel brightness adjustor inserting at least one high-speed pulse into a period of the modulated output light, which is required for a single pixel, and adjusting a brightness of the pixel by adjusting the number of the inserted high-speed pulses.

2. The apparatus of claim 1, wherein the digital modulator converts a color of tunable light output from the semiconductor laser to green light using a Quasi-Phase-Matching Second-Harmonic Generation (QPM-SHG) device and simultaneously performs digital on/off modulation.

3. The apparatus of claim 1, wherein the pixel brightness adjustor sets the number of high-speed pulses to a natural number obtained by dividing a frequency of the modulated output light by the repetition frequency of an analog light source used to realize the laser image display.

4. A method of modulating a particular light source for laser display, the method comprising:
    (a) digitally modulating light output from a semiconductor laser to a frequency higher than a repetition frequency required for laser image display; and
    (b) inserting at least one high-speed pulse into a period of the modulated output light, which is required for a single pixel, and adjusting brightness of the pixel by adjusting the number of the inserted high-speed pulses.

5. The method of claim 4, wherein operation (a) comprises converting a color of tunable light output from the semiconductor laser to green light using a Quasi-Phase-Matching Second-Harmonic Generation (QPM-SHG) device and simultaneously performing digital on/off modulation.

6. The method of claim 4, wherein operation (b) comprises setting the number of high-speed pulses to a natural number obtained by dividing a frequency of the modulated output light by the repetition frequency of an analog light source used to realize the laser image display.

* * * * *